United States Patent [19]
Henmi et al.

[11] Patent Number: 5,204,376
[45] Date of Patent: Apr. 20, 1993

[54] ANION EXCHANGER AND A METHOD FOR TREATING A FLUID

[75] Inventors: Masahiro Henmi, Otsu; Ken Noyorio, Moriyama; Toshio Yoshioka, Otsu, all of Japan

[73] Assignee: Toray Industries, Inc., Tokyo, Japan

[21] Appl. No.: 861,341

[22] Filed: Mar. 30, 1992

Related U.S. Application Data

[63] Continuation of Ser. No. 594,101, Sep. 25, 1990, abandoned.

[51] Int. Cl.$^5$ .............................. B01J 41/04; C08J 5/20
[52] U.S. Cl. ................................ 521/32; 521/29; 525/259; 525/374; 525/378; 525/379; 525/382; 528/397
[58] Field of Search ................ 525/259, 379, 382; 521/32, 29

[56] References Cited

U.S. PATENT DOCUMENTS 4,373,031  2/1983  Waite ............................. 521/32

Primary Examiner—Joseph L. Schofer
Assistant Examiner—Fred Zitomer
Attorney, Agent, or Firm—Nixon & Vanderhye

[57] ABSTRACT

The present invention relates to a new anion exchanger with excellent heat resistance and its use for treating a fluid to remove unwanted or unnecessary substances from it.

The anion exchanger has functional groups of the formula:

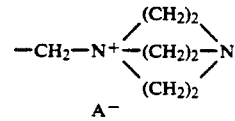

5 Claims, No Drawings

ANION EXCHANGER AND A METHOD FOR TREATING A FLUID

This is a continuation of application Ser. No. 07/594,101, filed Sep. 25, 1990, now abandoned.

TECHNOLOGICAL FIELD

The present invention relates to a new anion exchanger, especially an anion exchanger with excellent heat resistance and a method for treating a fluid using it.

BACKGROUND TECHNOLOGY

Prior to the present invention, anion exchangers have been widely used as adsorbents for a variety of ionic substances. As anion exchanging groups, primary, secondary and tertiary amines and quarternary ammonium salts can be cited, but among them, those of the trimethylbenzylammonium type, where trimethylamine is bound with a benzyl group of a polymonovinyl aromatic compound through a covalent bond, exhibit excellent ion exchange ability and are widely used.

However, these trimethylbenzylammonium salt type exchangers gradually decompose even at room temperature and the decomposition speed of the ammonium salt becomes significant especially at 60° C. or higher.

It is therefore impossible to use these at elevated temperatures. Therefore, when a fluid to be treated is at high temperature, the treatment should be performed after the temperature is actually lowered down to 20°–40° C. This wastes considerable energy and reduces efficient ion exchange and adsorption. In addition, there is a serious and annoying defect in that amine is generated by exchanger decomposition even at room temperature giving an unplesant odor. Therefore, an anion exchanger with higher heat resistance is needed.

Disclosure of the Invention

The present invention relates to an anion exchanger having an anion exchanging group of the following chemical formula (I)

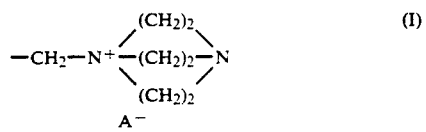

(I)

and a method for treating a fluid using said anion exchanger.

Most of the conventional anion exchangers have an anion exchanging group of the following chemical formula (II).

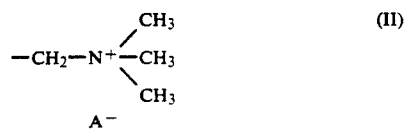

(II)

The exchanging group (I) of the present invention exhibits such excellent features that not only the total amount of the exchanging groups is large, but also surprisingly, the heat resistance is high. This is caused by a unique structure of the exchanging group (I).

The maximum working temperature of the conventional exchanging group (II) is 60° C. although it is usually used at 20°–40° C. On the other hand, the exchanging group (I) of this invention is more stable than the conventional exchanging group (II) and can be used at 60° C. or higher.

Therefore, it can be used in such fields where anion exchangers have not been applied previously due to poor heat resistance, e.g. in treating hot ultrapure water and where the working temperature has been unavoidably lowered, e.g. in the field of nuclear reactors and purification of medicines. In addition, as no characteristic odor of amines comes out, it can be also used for treating air and exhaust gas and removing tobacco smoke and other noxious odors. Furthermore, as there is little change with time and decomposed exchanger substance and elute hardly come out, it can be also used as a blood purification material, a filter for analysis and an ion exchange paper.

Therefore, the present invention can contribute considerably to energy saving in these fluid treating fields and achieve high clarification and fine analysis.

In the present invention, as the base body of the anion exchanger, polymonovinyl aromatic compounds and phenolic resins are preferably used. For example, styrene-divinylbenzene copolymer, homopolymers and copolymers of styrene, vinyltoluene etc., phenol resins and blends thereof can be cited. In addition, other polymer components such as poly (α-olefin) can be incorporated in these polymers as a blend or a composite. Furthermore, graft polymers of a monovinyl aromatic compound such as styrene onto vinyl polymers such as polyolefins, polyacrylates, halogenated polyolefins and flourinated polymers, polysaccharides such as cellulose and cellulose derivatives, polyamides, polyimides, polyesters, preferably in view of chemical resistance poly-α-olefins such as polypropylene and polyethylene and fluorinated polymers such as tetrafluoroethylene and polyvinylidene fluoride can be cited.

In the exchanging group (I), $A^-$ means a counter anion and is usually $OH^-$, a halogen anion, $BF_4^-$, $PCl_6^-$, and more preferably $OH^-$ or $Cl^-$. It is possible that a benzene nucleus of a polymonovinyl aromatic compound or a phenol resin can be directly bound with the exchanging group (I) through a direct covalent bond or containing an atomic group, so-called a spacer between them. As the spacer, $-(CH_2)_n-$ (wherein $n=1-10$), those containing an ether bond such as $-CH_2-O-CH_2-$ and amide bond can be cited.

The anion exchanger of the present invention has usually 0.1 mol or more, preferably 0.2 mol or more exchanging groups based on 1 mol of the benzene nucleus.

When the polymonovinyl aromatic compound is not crosslinked, it is used as a liquid anion exchanger, but it is usually used under a crosslinked and insolubilized condition from the view point of its form retention property. Styrene-divinylbenzene copolymer already has a crosslinked structure. On the other hand, for polymers such as styrene and vinyltoluene, a methylene group, a methoxymethylene group, etc., can be cited as the crosslinking group.

As the physical shape of a crosslinked and insolubilized anion exchanger of the present invention, resin-like (granulated and powdery), filmlike and fibrous (filamentary, short fiber, braided, knitted and woven and paperlike) shapes can be mentioned, but fibrous shapes are preferable considering their relative large surface area and freedom for shape design. A fiber containing a reinforcing polymer, especially a polycore-type composite or mixed fiber where a polymonovinyl aromatic compound is the sheath component and a poly(α-olefin) for reinforcement is the core component is preferably used from the points of strength and water-permeability.

The method for preparation of the anion exchanger with excellent heat resistance of the present invention is not especially limited and will be explained by using examples as follows.

As a gel type resin and a macroreticular (MR) type resin, which are styrene-divinylbenzene copolymers, and have crosslinked structures, chloromethyl groups are introduced in the aromatic nuclei as they are by conventional means. Furthermore, the chloromethylated resin is treated and reacted with a solution of triethylenediamine of the above structural formula to prepare an anion exchanger of the present invention. Solvents for triethylenediamine include water, alcohols such as methanol and ethanol, hydrocarbon solvents such as benzene and toluene and polar solvents such as N,N-dimethyl-formamide and N-methylpyrrolidone.

On the other hand, the fibrous material is prepared in an islands-in-a-sea configuration in such a way that a polymonovinyl aromatic compound is a main component of the sea component and a poly (α-olefin) as a reinforcing polymer is an island component. After the fibers are made into a variety of shapes, methylene crosslinking bondings are introduced by treating them with a sulfuric acid solution containing a formaldehyde source to insolubilize the sea component. Then, in the same way as the resin, chloromethyl groups are introduced and furthermore, they are treated and reacted with triethylenediamine to prepare an anion exchange fiber of the present invention.

A method for treating a fluid of the present invention is characterized by using the anion exchanger having the exchanging group (I) as at least one component of an ion exchanger and an adsorbing material. The anion exchanger can be used alone or as a mixture with another ion exchanger or adsorbing material or by using them alternatively. No limitation exists on how to combine it with other ion exchanger and adsorbing materials. As the ion exchanger, cation exchangers having sulfonic acid groups, phosphoric acid groups or carboxylic acid groups, chelating exchangers having aminocarboxylic acid groups, amidoxime groups, aminophosphoric acid groups, polyamine groups, and dithiocarbamic acid groups among others can be cited. As the adsorbing material, active carbon and zeolite can be cited.

The method for treating a fluid according to the present invention can be applied in fields where conventional anion exchangers have been used, e.g. preparation of pure water, water-recycling systems and pure water systems in nuclear power plants and thermal power stations, recovery of useful inorganic anions, decoloring and desalting of sugar solutions, purification and separation of antibiotics and various medicines, purification and separation of amino acids, adsorption of organic bases, adsorption of surface active agents, purification of iodine, adsorption of coloring matters such as dyes, adsorption and removal of proteins, peptides, enzymes, nucleic acids, hormones, alkaloids, nucleotides, lipids, steroids, cells such as bacilli, inorganic colloids such as iron oxide and silica and organic colloids, to name a few. Furthermore, these ion exchangers used where the fluid is a liquid such as water and chemicals, e.g., purification of organic chemicals such as methanol and acetone. In addition, it can be also applied in the fields where the fluid is a gas such as adsorption and removal of an acidic gas such as hydrogen sulfide, hydrogen halide, sulfur dioxide, iodine gas, methyl iodide gas and bad odors.

However, the method for treating a fluid of the present invention can be effectively applied and is especially adapted in fields where application and clarification are difficult with the conventional anion exchangers.

To explain further, in the preparation of ultrapure water, both a cation exchanger having sulfonic acid groups and an anion exchanger are used, but a very small amount of organic substances (TOC) are produced caused by the decomposition of the anion exchanger and this causes a problem in washing semiconductors corresponding to 4M bits or larger. In addition, there is a serious problem in that as the anion exchanger decomposes, part of ion exchanger cannot be sterilized with hot water. Furthermore, from the viewpoint of effective washing, it is required to manufacture continuously hot ultrapure water by means of an ion exchanger. The method for treating a fluid of the present invention can effectively contribute to the preparation of this ultrapure water.

In the treatment of the recycling water in nuclear power plants, both a cation exchanger and an anion exchanger are used, but the real condition is that the recycling water at 100° C. is intentionally and necessarily cooled down to 30°–40° C. because conventional exchangers lack suitable heat resistance and decompose at operating temperatures approaching 100° C. Cooling to a lower temperature causes a tremendous energy loss. The treatment method of the present invention enables treatment at high temperatures and is extremely effective for the treatment of the recycling water in nuclear power plants.

In the purification of highly pure chemicals for the electronics industry chemicals such as methanol, propanol, acetone and hydrogen peroxide water, removal of fine particles and ions at high level are important. But when a conventional anion exchanger is used, decomposition occurs and a very small amount of organic substances (TOC) are generated. From this point of view, the fluid treatment method of the present invention is effective for purification treatment of highly pure chemicals for the electronics industry.

Conventional anion exchangers in the dry form give off a noxious amine odor caused by decomposition is very excessive and it cannot be used for purification of air, and removal of harmful substances in tobacco smoke and other bad odors. No odor is generated by the anion exchanger of this invention so it is effective for efficient cleaning treatment of gases and for this purpose the anion exchanger is formed into air filters, masks, tobacco filters, etc.

In addition, as the change in the anion exchanger with time and eluted substances caused by decomposition of the exchanger is very little and negligable, it is especially useful for analytical treatments and procedures, clean-up and purification of blood when it is used as an ion exchange paper.

As described above, the present invention provides an anion exchanger with a large exchange capacity and excellent heat resistance and secondarily, a significant exchanger for treating fluids.

The present invention is further described and illustrated but not limited by the following examples in which all parts and percentages are by weight unless indicated otherwise.

EXAMPLES

In the examples that follow the exchange capacity (milli-equivalent) was measured as follows. 50 ml of 0.1N hydrochloric acid was added in 0.5 g of OH⁻ type anion exchanger and the mixture was shaken for 4 hr. 5 ml thereof is taken out and 5 ml of 0.1N sodium hydroxide aqueous solution was added and the mixture was titrated using 0.1N hydrochloric acid. Specific electric resistance, total organic carbon, atomic-absorption spectrum and inorganic anion were respectively measured by means of AQ-11 type specific resistance meter manufactured by DKK Co., Ltd., Automatic analyzer TOC 710 type manufactured by Toray Engineering Co., Ltd., Z8000 flameless atomic-absorption spectroscope manufactured by Hitachi Ltd., and Model IC500P ionchromatoanalyzer manufactured by Yokogawa Hokushin Electric Works, Ltd. Quantitative analyses of iodine gas and hydrogen cyanide gas were performed using Kitagawa-type gas detector.

EXAMPLE 1

A multi-core islands-in-a-sea type composite fiber (undrawn) in which the sea component (polystyrene)/the island component (polyethylene)=50/50; number of islands was 16; the fiber diameter was 34 μ, was cut into a cut fiber of 0.5 mm in length. 10 parts by weight of the cut fibers were added to a crosslinking liquid consisting of 50 parts by volume of a commercially available reagent grade sulfuric acid, 5 parts by volume of water and 2 parts by weight of paraformaldehyde and reacted at 60° C. for 4 hr. The fibers were washed and dried. Then, the resulting crosslinked fibers were added to a chloromethylation liquid consisting of 3 parts by volume of chloromethyl ether, 8 parts by volume of tetrachloroethane and 0.15 part by volume of stannic chloride and reacted at 50° C. for 4 hr to obtain chloromethylated fibers 1 part by weight of these chloromethylated fibers was added to a reaction liquid consisting of 2 parts by weight of triethylenediamine and 15 parts by volume of N,N-dimethylformamide and reacted at 60° C. for 4 hr to obtain triethylenediamine type anion exchange fibers of formula (I) of the present invention.

Hot water treatment at 100° C. and dry treatment at 80° C. on the obtained anion exchange fibers (OH type) were performed and exchange capacities before and after the treatments were measured. The obtained results were summarized in Table 1.

COMPARATIVE EXAMPLE 1

1 part by weight of the chloromethylated fibers described in Example 1 was added to 10 parts by volume of a 30% trimethylamine aqueous solution and aminated at 30° C. for 3 hr and then washed to obtain trimethylammonium type anion exchange fibers (OH type) of formula (II). These were heat-treated in the same way as Example 1 and the exchange capacities before and after the treatment were measured. The results are summarized in Table 1.

As shown in Table 1, the residual ratio of exchange capacity was higher for the anion exchange fiber obtained by the present invention after both hot water and dry heat treatments and the value was excellent in the dry condition.

TABLE 1

| | | Changes in Exchange Capacities after Heat Treatments | | |
|---|---|---|---|---|
| | | Exchange capacity (milli-equivalent) | | |
| | | Before treatment | After treatment | Residual ratio (%) |
| Hot water treatment | Example 1 | 2.8 | 2.6 | 93 |
| | Comparative Example 1 | 2.0 | 1.6 | 80 |
| Dry heat treatment | Example 1 | 2.8 | 2.6 | 93 |
| | Comparative Example 1 | 2.0 | 1.4 | 70 |

EXAMPLE 2

10 parts by weight of cut fibers obtained in Example 1 were treated and reacted with a crosslinking sulfonating liquid consisting of 75 parts by volume of sulfuric acid and 1 part by weight of paraformaldehyde at 90° C. for 4 hr to obtain sulfonic acid-type cation exchange fibers.

An ion exchange column (1) of an apparatus consisting of the ion exchange column (1), a reverse osmosis membrane (2) and a heater (3) was packed with a mixture of the sulfonic acid type cation exchange fiber (H type) and the triethylenediamine type anion exchange fiber obtained by Example 1 (OH type) at a ratio of 1:1 (the dry weight was 100 g).

The apparatus was sterilized by passing an original water (specific electric resistance was 0.1 MΩ·cm and TOC was 60 ppb) through the apparatus, elevating the temperature of the water up to 80° C. by heating, stopping the water supply and circulating water between (1)–(3) for 1 hr. After sterilization was completed, water circulation was stopped and ultrapure water was manufactured by passing the original water at a speed of 60 l/hr. The quality of water after 30 min at a sampling hole was measured and the results are shown in Table 2.

COMPARATIVE EXAMPLE 2

A mixture of the sulfonic acid type cation exchange fibers (H type) obtained by Example 2 and the trimethylammonium type anion exchange fibers (OH type) obtained by Comparative Example 1 at a mixing ratio of 1:1 (the dry weight of 100 g) was packed in the column (1) of the apparatus of Example 2 and the same tests as those in Example 2 were performed. The results are shown in Table 2.

As clearly shown in Table 2, as the anion exchanger of the present invention exhibited excellent heat resistance, after heat sterilization, eluted substances caused by decomposition were extremely small, the increase in specific resistance was fast and the value of TOC was low. As described above, sterile management during operation was easy and it was suitable for manufacturing ultrapure water.

TABLE 2

| | Measured Results of Water Qualities | | |
|---|---|---|---|
| | Specific electric resistance (MΩ·cm) | TOC (ppb) | Rising time in specific resistance (min) |
| Example 2 | 18.25 | 20 | 5 |
| Comparative Example 2 | 18.20 | 60 | 30 |

EXAMPLE 3

10 parts by weight of the cut fibers obtained by Example 1 were treated and reacted with a crosslinking sulfonating liquid consisting of 75 parts by volume of sulfuric acid and 0.6 parts by weight of paraformaldehyde at 90° C. for 4 hr and additionally at 100° C. for 3 hr to obtain sulfonic acid type cation exchange fibers.

50 g of the triethylenediamine type anion exchange fibers (OH type) obtained by Example 1 and 50 g of the sulfonic acid type cation exchange fibers (H type) were mixed and stirred in pure water and the mixture was packed in a column. Pure water at 80° C. containing 20 ppb of ferric oxide ($\alpha$-$Fe_2O_3$ was passed through it at a speed of 60 l/hr and specific electric resistance (M$\Omega$·cm), iron concentration (ppb measured by atomic-absorption spectroscopy) and TOC (ppb) were measured at the outlet. The results obtained are shown in Table 3.

COMPARATIVE EXAMPLE 3

50 g of the trimethylammonium type anion exchange fibers (OH type) and 50 g of sulfonic acid type cation exchange fibers (H type) were mixed and stirred in pure water and the mixture was packed in a column. The same tests as those in Example 3 were performed and the results are shown in Table 3.

As clearly shown in Table 3, as the anion exchanger of the present invention exhibited excellent heat resistance, any decrease in performance caused by decomposition of the functional groups was small and eluted substances were slight even when the liquid was run at high temperature and as the result, comparing with the conventional anion exchanger, water quality of the treated water was extremely good. It was found as described here that the treatment method of the present invention was effective for the treatment of recycling water at high temperatures and for manufacturing hot ultrapure water.

TABLE 3

| Test Results on the Run of Water Containing Iron Oxide | | | |
|---|---|---|---|
| | Specific electric resistance (M$\Omega$·cm) | Concentration of iron (ppb) | TOC (ppb) |
| Example 3 | 18.25 | 0.5 or less | 20 |
| Comparative Example 3 | 18.15 | 0.5 or less | 100 |

EXAMPLE 4

10 parts by weight of the triethylenediamine type anion exchange fibers obtained in Example 1, 2.5 parts by weight of a polyethylene synthetic pulp and 1 l of pure water were beat into a pulp and made into a paper-like material by a paper-making machine. The paperlike material was then dehydrated under compression and after drying, a surface treatment was performed thereon by means of hot rolls under pressure to prepare a sheetlike material with excellent wet strength. No odor came out at all during manufacturing.

The sheetlike material so prepared was placed on a filter apparatus and a test water containing 10 ppb ionic chromium and pretreated with a cation exchanger was passed through it. After processing for a while, chromium ion was quantitatively analyzed by means of atomic-absorption spectroscopy and the collecting efficiency calculated by the following equation was 99%.

In addition, after the sheetlike material was sealed and kept in a polyethylene bag for a month, another collecting test was performed again by the same method. In this case, the collecting efficiency was found to 99% again and no deterioration was recognized.

Collecting efficiency (%) =

$$\left(1 - \frac{\text{Concentration at outlet}}{\text{Concentration at inlet}}\right) \times 100$$

COMPARATIVE EXAMPLE 4

Using the trimethylamine type anion exchange fibers (OH type) obtained by Comparative Example 1, a sheet was made by the same procedures as those of Example 4 and the same tests were performed.

Amine odor was recognized and the collecting efficiency was 95% just after the sheet was made; later the collecting efficiency decreased to 90% after one month. Heat deterioration during manufacturing and decrease in properties with time were recognized. In addition, a ventilating apparatus was needed as odor was terrible when the sheets were manufactured.

EXAMPLE 5

5 g of triethylenediamine type anion exchange fibers obtained by Example 1 were packed in a glass column and 500 ml of hydrogen peroxide aqueous solution (the concentration was 34%) were passed through it at a speed of 25 ml/min.

Concentrations of sulfuric acid ion ($SO_4^{--}$) and phosphoric acid ion ($PO_4^{---}$) before and after the treatment by passing the fluid were quantitatively analyzed by means of ion chromatography and the results are shown in Table 4. It was recognized that the method for treating of the present invention also was effective for purification of high purity chemicals.

TABLE 4

| Concentration of Impurity Ions in Hydrogen Peroxide Aqueous Solution | | |
|---|---|---|
| | Before treatment (ppb) | After treatment (ppb) |
| $SO_4^{--}$ | 710 | 20 |
| $PO_4^{---}$ | 250 | 8 |

COMPARATIVE EXAMPLE 5

The same tests as those in Example 5 were performed on the trimethylamine type anion exchange fibers (OH type) obtained by Comparative Example 1 and it was found that compared with Example 5, a large amount of bubbles were generated and hardly treated.

EXAMPLE 6

1 g of triethylenediamine type anion exchange fibers (OH type) obtained by Example 1 was packed in a packed column and gaseous iodine generated by an iodine gas generating apparatus was passed through it at a speed of 45 cm/sec (the concentration of iodine was 1 ppm). No iodine was detected at the outlet of the packed column. No odor was detected either. This demonstrated that the treatment method of the present invention can be used for treating air.

COMPARATIVE EXAMPLE 6

The same tests as those in Example 6 were performed on the trimethylamine type anion exchange fiber (OH type) obtained in Comparative Example 1 and it was found that while the adsorption characteristic for iodine was good odor (amine odor) at the outlet was extremely strong.

EXAMPLE 7

20 mg of triethylenediamine type anion exchange fibers (OH type) obtained in Example 1 were packed in the filter part of a commercially available tobacco cigarette ("Cherry" manufactured by Japan Tobacco Co., Ltd.) and a smoking test was done using an automatic smoking apparatus at flow quantity of 17.5 ml/sec, a smoking time of 2 sec, a smoking distance of 58 sec and a burning length of 40 mm. The quantities of tar and hydrogen cyanide passed through the filter were measured and it was found that the quantities were decreased to each 80% and 50% compared with those of the commercially available tobacco. In addition, change in smoking taste was very little. It was found that the method for treating of the present invention was effective for removing harmful gases in tobacco smoke.

COMPARATIVE EXAMPLE 7

The trimethylamine type anion exchange fibers obtained in Comparative Example 1 were packed in the same way as Example 7 and the same tests were performed. It was found that the odor was terrible and smoking taste was remarkably spoiled.

We claim:

1. A crosslinked vinyl aromatic polymer or phenolic resin-based anion exchanger having an anion exchanging group of the formula:

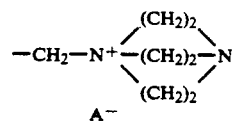

in which the exchanging group is bound to the aromatic nucleus of a side chain of said aromatic polymer or said phenolic resin via the methylene group, wherein the anion exchanger has at least 0.1 mol of the anion exchanging group per mol of said aromatic nucleus and wherein $A^-$ is a counter ion.

2. An anion exchanger described in claim 1 in the form of a particle, powder, film or fiber.

3. An anion exchanger as described in claim 2 in the form of a fiber.

4. A composite comprising a sheath of the anion exchange fiber described in claim 3 and a reinforcing polymer core.

5. The composite described in claim 4 wherein the reinforcing polymer is a poly-α-olefin.

* * * * *